July 7, 1964     H. F. HENRY     3,140,397

NEUTRON DETECTOR UNIT UTILIZING INDIUM

Filed Sept. 20, 1962

INVENTOR.
Hugh F. Henry

BY

ATTORNEY.

United States Patent Office 3,140,397
Patented July 7, 1964

3,140,397
NEUTRON DETECTOR UNIT UTILIZING INDIUM
Hugh F. Henry, Greencastle, Ind., assignor to the United States of America as represented by the United States Atomic Energy Commission
Filed Sept. 20, 1962, Ser. No. 225,172
12 Claims. (Cl. 250—83.1)

This invention relates generally to neutron dosimetry and more particularly to novel means for measuring fast neutron energy spectra under high dose rate conditions.

The prompt and accurate determination of radiation doses received by persons involved in a possible inadvertent critical reaction is a matter of vital concern to installations handling large quantities of fissile materials. Accurate knowledge of the radiation dose is of great importance to medical personnel in determining the course of treatment for patients exposed to a critical reaction.

In a typical installation handling fissile materials, neutron-responsive threshold detector units are employed at selected locations. These detector units are designed to permit an estimation of the neutron energy spectra existing at the selected locations if a critical incident occurs. The total neutron tissue dose received by a person at a given location then can be calculated by a formula based on the neutron energy spectrum to which he was exposed and on the amount of sodium-24 formed in his body as a consequence of his exposure.

A typical threshold detector is designed to measure the number of neutrons (neutron flux) in five energy ranges. The detector incorporates two groups of neutron-activatable materials for this purpose. One group, consisting of gold and cadmium-shielded gold, is used to determine the thermal neutron flux. Indium and cadmium-shielded indium may also be used for this purpose. The other group is used to determine the fast neutron flux. This latter group consists of sulfur-32 and an encapsulated series of metallic wafers, or fission foils. These foils comprise a uranium-238 foil sandwiched between a plutonium-239 foil and a neptunium-237 foil, the sandwich being encapsulated in cadmium and then in a boron-10 ball. In other arrangements, the Np-237 is mounted between the U-238 and the Pu-239 foils, or the Pu-239 foil is placed in the central position. The boron is provided to shield the metallic foils primarily from slow neutrons, and the cadmium is provided to capture any thermal neutrons penetrating the boron shield or moderated to thermal energies by the boron shield. A description of the above-described detector unit is set forth in U.S.A.E.C. Report ORNL–2784 (Part A), issued November 16, 1959, entitled "Radiation Accidents: Dosimetric Aspects of Neutron and Gamma-Ray Exposures."

If the above-described threshold detector unit is exposed to the neutron flux from a critical accident, each of the detector elements is activated by a different portion of the neutron energy spectrum. A suitable counter then may be employed to measure the activity (beta in the case of the sulfur; gamma in the case of the foils) of each of the detector elements. The count-rates so obtained are used to calculate the total number of fissions and the neutron flux corresponding to that number of fissions. The shielded detector elements listed in ORNL–2748 respond to non-thermal neutrons as follows: The Pu-239 provides a measurement of the flux above 1 kev.; the Np-237, of the flux above 0.75 mev.; and the U-238, of the flux above 1.5 mev. The S-32 provides a measurement of the flux above 2.5 mev. The thermal neutron flux is measured by calculations based on the difference in the induced activities of the above-mentioned gold and cadmium-shielded gold. Similar determinations can be made with indium and cadmium-shielded indium. From these various flux measurements the total neutron dose can be derived.

A threshold detector of the type described above has several disadvantages. A typical unit with the foils costs about $1400.00, the cost of the boron ball alone being about $600.00. This is an important consideration where safety considerations dictate the use of a relatively large number of detectors. Another disadvantage of the above conventional threshold detector is that the decay of each of the activated fission foils is characterized by the emission of a wide range of activities having different half-lives and thus a low sensitivity. This greatly complicates making an accurate determination of the total neutron dose, especially if the reaction is a continuous one with widely varying power levels. Some of the foils are naturally radioactive and their emission may affect the instruments, such as scintillation detectors, used to measure the induced activities resulting from a critical incident. Furthermore, the half-lives of the foil emissions of most interest are comparatively short, necessitating prompt retrieval of the detectors after a critical accident. Prompt retrieval may not be possible in large plants where any one of many locations might be the site of the critical reaction, and since the detectors to be retrieved will be near the site of the accident, prompt retrieval may be hazardous where it is uncertain whether the initial reaction has stopped or where there is a possibility it may recur. The use of the Pu-239 fission foil poses various health physics control problems, since a fire might distribute the plutonium widely about the area being monitored.

With a knowledge of the shortcomings and problems associated in the use of the above-described system, particularly in relation to the monitoring of large production areas, which stem from the low sensitivity of the fission foils, the rapid decay of the fission-product activity by which neutron data are obtained from these elements, and the high cost of the units, it is a primary object of this invention to provide a relatively inexpensive neutron detector unit or units to replace the fission foil detector unit of the above system.

It is another object of this invention to provide a neutron detector unit having a sensitivity much greater than conventional units.

It is still another object of this invention to provide a neutron detector unit in which the decay of the fission-product activity is relatively long compared to conventional units.

It is yet another object of this invention to incorporate the neutron detector aspects of this invention into a personnel badge dosimeter.

These and other objects and advantages of this invention will become apparent upon a consideration of the following detailed specification and the accompanying drawing wherein.

The above objects have been accomplished in the present invention by utilizing an indium body mounted within an indium shield and a cadmium shield to serve the purpose of the U-238 fission foil of the conventional unit, by utilizing a manganese body mounted within an indium shield and a cadmium shield to serve the purposes of the Np-237 and Pu-239 fission foils of the conventional unit, or by a combination of these units in a single detector unit consisting of a central indium ball surrounded by a manganese shell, an indium shield, and a cadmium shield.

Figure 1:
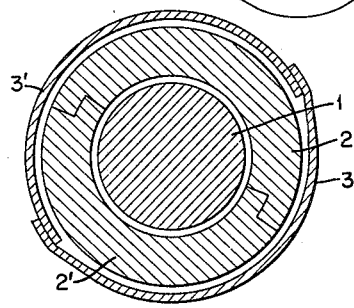
FIG. 1 is a cross-sectional view of one modification of a neutron detector unit.

Referring now to the drawing, FIG. 1 illustrates one embodiment in which the principles of this invention may be carried out. In FIG. 1, the ball 1 may be either indium or manganese depending upon which energy range of the fast neutron fluxes it is desired to detect. The ball 1 is mounted within an indium shield consisting of mated overlapping hemispheres 2, 2', as shown, and shields 2, 2' are in turn mounted within a cadmium shield consisting of overlapping hrmispheres 3, 3', as shown in the drawing. Overlapping of the shields prevents neutron leakage therethrough. The various components of this embodiment are preferably in the form of spheres to avoid the orientation dependence common to detectors of the prior art. The spheres whose induced activities are to be measured preferably are flattened before counting to permit the use of conventional equipment and to minimize self-absorption, but this is not necessary.

One assembly, consisting of the indium ball shielded by the indium and cadmium shields, serves the purpose of the above-mentioned U-238 fission foil of the conventional detector. That is, the shielded indium ball provides a measurement of the neutron flux above about 1.5 mev.

Another assembly, consisting of a similarly shielded manganese ball, serves the purposes of the above-mentioned Np-237 and Pu-239 fission foils of the conventional detector. That is, the shielded manganese ball provides a measurement of the neutron flux in the range of about 0.005 to 1.5 mev.

It should be understood that gamma radiations are also of primary interest to personnel exposed to radiation from a criticality accident. However, the present invention is concerned primarily with an improved means for detecting fast neutron energy spectra under high dose rate conditions. For a discussion of gamma dosimeter systems, reference is made to various books, such as Radiation Hygiene Handbook, published by McGraw-Hill Company, 1959.

Tests conducted with indium shielded with indium and cadmium, and with manganese shielded with indium and cadmium have indicated that, compared with the conventional threshold detector unit, they provide at least as accurate and precise measurements of the neutron fluxes specified above, without the use of sulfur-32. Even more accurate dose determination can be made with these units if they are used in conjunction with sulfur-32, which is cheap and readily obtained.

As indicated above, the use of the indium-indium-cadmium assembly will provide an accurate measurement of the fast neutron flux above about 1.5 mev. As an index of this flux, the 0.5 mev. threshold reaction of indium has been selected for the purposes of the present invention. This threshold reaction of indium is characterized by the emission of a 0.335 mev. gamma having a half-life of 4.5 hours. Normally, this so-called 4.5-hour emission would be masked for a long period by other gamma emissions resulting from the 54-minute half-life thermal and low-energy neutron reactions of the indium. In the case of bare indium, for example, the 54-minute emissions produced by exposure to a certain neutron flux would preclude accurate counting of the 4.5-hour emission for about 16 hours. Consequently, there are provided the aforementioned shields composed of cadmium, which primarily removes thermal neutrons, and of indium which primarily removes low-energy neutrons. The indium shield will also capture thermal neutrons.

It has been determined that indium is an effective shield for indium where the objective is to effect a large reduction in the 54-minute activation (a reduction by a factor in the range of at least about 8 to 1), while effecting a comparatively minute reduction in the 4.5-hour half-life activation. The use of an indium shield thus considerably reduces the time necessary to read the 4.5-hour half-life activity. By providing a shield composed of the same material as the detector, it is ensured that the absorption curve of the shield is substantially the same as the activation curve of the detector. This in turn ensures that the high 54-minute activation peaks of the detector are shielded with correspondingly high absorption peaks, and that the comparatively low 4.5-hour activation energy range of the detector is shielded by a small absorption characteristic. Thus, as desired, the indium shield absorbs a much larger fraction of the low-energy neutrons capable of producing the 54-minute activation than it absorbs higher-energy neutrons capable of producing the 4.5-hour activation. Thermal neutrons also produce the 54-minute activation. Thus, it is preferred to also use the thermal-neutron-absorbing cadmium shield in conjunction with the indium shield. However, it is entirely possible that an indium shield alone would reduce the thermal neutrons to the required extent, and in this case the cadmium shield may not be required.

Figure 2:
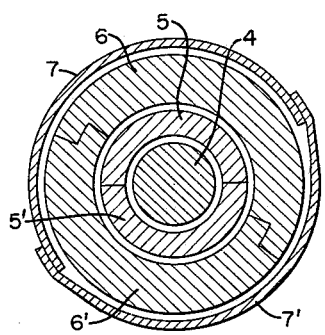
FIG. 2 is a cross-sectional view of another modification of a neutron detector unit.

The actual size of the detector unit of FIG. 1, and also FIG. 2, is about half as large as that shown on the drawing. The advantages of using indium shielded with indium and cadmium as a replacement for the usual U-238 foil shielded with cadmium and boron-10 may be summarized as follows: (1) The internal precision of the flux measurements made with the indium-indium-cadmium detector is much greater than that obtainable with the U-238 foil shielded with boron-10. (2) The cost of an indium-indium-cadmium detector is a small faction of the cost of the conventional unit, and indium is much more readily obtainable than is boron-10. (3) The decay rate of an indium-indium-cadmium detector is such that low-level exposures can be detected for much longer periods after occurrence. For example, an initial exposure of 2 rads to the present detector will result in an activity of about twice background on certain counters after 10 hours. An exposure of at least 140 rads would be required to produce a corresponding activity in a U-238 foil. In addition, the U-238 activity continues to decay at a much more rapid rate than does the indium activity. This means that the present detector has the advantage, from the safety standpoint, of not requiring as prompt retrieval as the U-238 in order to obtain a readily measurable count. (4) The use of an indium shield in combination with a cadmium shield permits accurate measurements of the activity of the 4.5-hour threshold reaction in less than six hours after an exposure. (5) As mentioned previously, indium has the advantage, compared to U-238, of not being naturally radio-active and of not having a large number of emissions of different intensities and half-lives.

It has been determined that in most applications the U-238 foils of the conventional units will respond to those neutrons which produce approximately 50 percent of the total neutron dose, and thus a close estimate of the total neutron dose can be made by extrapolation of the dose determined from the response of the boron-shielded U-238 alone. Since the response of the present indium-indium-cadmium detector has been found to closely parallel that of shielded U-238, the present indium detector could be used alone for certain types of flux measurements to serve the purposes of the entire foil assembly of the conventional unit.

As indicated above, the device of FIG. 1 can employ the use of manganese as a flux detector and in this case the ball 1 is manganese with the indium shields 2, 2' and the cadmium shields 3, 3' enclosing the manganese ball 1. The shielded manganese serves the purposes of the boron-and-cadmium shielded Np-237 and Pu-239 foils of the conventional detector, and provides a measurement of the neutron flux in the range of 0.005 to 1.5 mev. As in the indium-indium-cadmium combination, the indium and cadmium shields absorb thermal and low energy neutrons. This permits the activation of the manganese to be produced primarily by the higher energy neutrons such that the activation is proportional to the flux in the range of about 0.005 to 1.5 mev.

Comparisons of the performance of the shielded manganese detector with that of a conventional detector unit have shown that the internal precision of dose measurements with the shielded manganese detector is equivalent to that of the foils of the conventional unit it is designed to replace. Also, the decay rate of the manganese detector permits ready measurement of its activity for long periods. For example, a one-gram manganese detector given an initial exposure of 2 rads will exhibit twice the background activity after ten hours. The corresponding figures for equivalent size Pu-239 and Np-237 foils would be about 90 rads and 55 rads, respectively.

The advantages of replacing the neptunium and plutonium fission foils with manganese are as follows: (1) In contrast to fission foils, the activated manganese activity comprises a single, relatively long, readily identifiable half-life. This advantage is especially important for applications involving long-continuing reactions of widely varying power levels. (2) As pointed out above, the sensitivity of the manganese for neutron detection is much greater than those of the neptunium and plutonium, permitting an accurate determination of lower neutron fluxes for longer periods of time following an exposure. (3) Unlike plutonium and neptunium, manganese is not a potential health hazard.

The individual neutron detectors, that is, the indium-indium-cadmium detector and the manganese-indium-cadmium detector described above may be combined into a single unit as shown in FIG. 2. In this figure a central indium ball 4 is surrounded by a manganese shell consisting of two hemispheres 5, 5', an indium shield consisting of two overlapping and mating hemispheres 6, 6', and a cadmium shield consisting of two overlapping hemispheres 7, 7'. It should be noted that the positions of the indium ball and the manganese could be interchanged. As in the individual units, the shielded indium ball provides for a measurement of the neutron flux above 1.5 mev., and the shielded manganese shell provides for a measurement of the neutron flux in the range of 0.005 to 1.5 mev.

Figure 3:
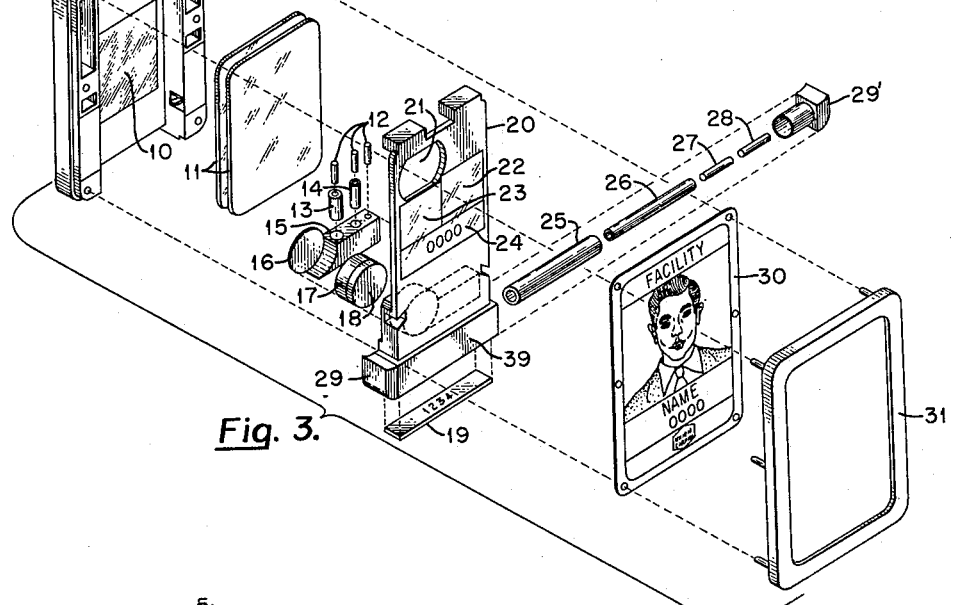
FIG. 3 is an exploded view of a personnel badge dosimeter which includes a neutron detector unit in accordance with the present invention.

The principles of this invention can also be incorporated in a personnel dosimeter badge using film and perhaps other units for routine monitoring of possible exposure to penetrating radiation. Such a badge is described in U.S. A.E.C. Report ORNL-3126, issued December 21, 1961; however, there are a wide variety of badges having a similar function and generally similar dimensions used throughout this country and abroad, and the principles of this invention are applicable to and may be incorporated either in such badges or as an appendage thereto. An example of such usage is shown in FIGURE 3 of the drawing. In this usage, the badge described in the above-mentioned report, ORNL-3126, is modified by using the housing 39 designed to enclose a chemical dosimeter, but replacing the chemical dosimeter with a neutron detector unit as shown in FIG. 3 of the drawing. This neutron detector unit comprises an outer cadmium shield 25 in the form of a tubular sleeve, a smaller inner tubular indium shield 26 which fits within the shield 25, and an indium detector rod 27 and a manganese detector rod 28 which fit within the shield 26. The shield 25 with the members 26, 27 and 28 inserted therewithin fit within the hollow housing 39, and the housing 39 has end plugs 29, 29' fitted therewithin. It should be understood that the indium rod 27 or the manganese rod 28 may be omitted in the neutron detector unit of FIG. 3, if desired, in the event that the neutrons desired to be detected fall into the detectable energy range of one of these detector rods.

The neutron detector unit of the badge of FIG. 3 operates and functions in the same manner as the detector unit described above for FIG. 2. It should also be understood that the badge described in ORNL-3126 may also be modified to use the neutron detector unit without eliminating the chemical dosimeter if such is desired. This could easily be done by adding another housing to the bottom of the badge for housing such a dosimeter. In the same way, such a housing could easily be added to the bottom or other convenient position on any other badge of this type for housing the neutron detector unit, The remainder of the components of any badge, including that described in ORNL-3126, for example, components 9-24, 30 and 31 in FIG. 3 of the drawing, will serve their same functions.

Figure 4:
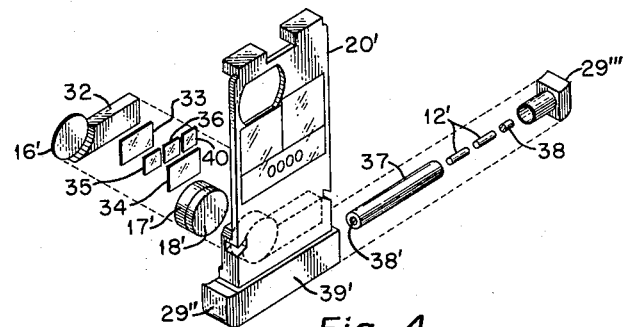
FIG. 4 is a modification of the badge of FIG. 3.

In another application of this invention, the neutron detector unit may also be incorporated in the body of a personnel dosimeter as shown in FIG. 4 of the drawing. In usage of this type, the neutron detector comprises an indium foil 35 and a manganese foil 36 of a convenient weight, for example, one gram each or less (although this weight is not critical) sandwiched between shields 33 and 34. Each of the shields 33 and 34 includes one layer of indium and one layer of cadmium of selected thickness. For example, the indium may be 0.030 inch thick and the cadmium may be about 0.036 inch thick. Also the indium shield may vary in thickness from 0.015 to 0.120 inch. The neutron detector unit may be positioned and held within the body of the personnel dosimeter by any convenient method. As an example of the use of this type of construction of the neutron detector unit, this unit may be placed in the position of the glass rods of the personnel dosimeter described in the aforementioned report, ORNL-3126, and the glass rods approximately positioned in the housing originally provided for the chemical dosimeter.

FIG. 4 also shows how an unshielded indium foil 40 having a weight of about the same as the shielded indium foil 35 may be added to the badge so that the thermal neutrons may also be measured from readings of the 54-minute half-life activity on the unshielded indium foil 40 and on the readings of the half-life activity on the shielded indium foil 35. This is not necessary in the badge described in the report ORNL-3126, since the badge uses shielded and unshielded gold foils for this purpose. However, it could be used in badges which do not have other means for determining the thermal neutron flux.

The principles of this invention can also be incorporated in a personal identification device which does not include provisions for routine monitoring of possible exposure to penetrating radiation. Such a device, consisting of an identifying photograph and other information sandwiched in a plastic laminated identification badge is shown and described in Nuclear Science and Engineering, May, 1959, pages 285-290. In usage of this type, the neutron detector is arranged in the same manner as is the detector as shown in FIG. 4 with an indium foil and a manganese foil sandwiched between shields each consisting of a layer of indium and a layer of cadmium of convenient thickness. Less precise but possibly usable information could be obtained if the shields consisted only of cadmium. Also, the addition of an unshielded indium foil to such a badge would permit determination of the thermal neutron flux.

When any of the neutron detectors described above are exposed to the neutron flux from a critical accident the activity of each of the detector elements may be measured by any suitable counter such as described in the aforementioned report, ORNL-2748 (Part A).

The present invention has been described by way of illustration rather than limitation and it should be apparent that this invention is equally applicable in fields other than those described.

What is claimed is:

1. An improved neutron detector for the detection of fast neutron fluxes having an energy in the range of about 0.005 mev. and above, comprising an indium body and a manganese body, and a common indium shield and a common cadmium shield encompassing said indium body and said manganese body.

2. An improved neutron detector for the detection of fast neutron fluxes having an energy above about 1.5 mev., comprising an indium body, an inner indium shield encompassing said indium body, and an outer cadmium shield encompassing said indium shield, the thicnkess of said shields being selected to reduce by a factor of at least 8 to 1 the 54-minute half-life activation which would be characteristic of the indium body if exposed to the same flux in the unshielded condition, while at the same time effecting a comparatively minute reduction in the 4.5-hour half-life activation, whereby the activity of the 4.5-hour threshold reaction can be accurately measured in less than six hours after an exposure.

3. An improved neutron detector for the detection of fast neutron fluxes having an energy in the range of about 0.005 to 1.5 mev., comprising a manganese body, an indium shield encompassing said manganese body, and a cadmium shield encompassing said indium shield, said shields serving as a means for absorbing thermal and low energy neutrons.

4. In a personnel dosimeter badge which includes means for identifying thermal neutron fluxes and means for identifying other penetration radiations, the improvement comprising a neutron detector assembly mounted within said badge for identifying fast neutron fluxes, said neutron detector assembly including an indium neturon detection member, a manganese neutron detection member, an indium shield member encompassing said indium and manganese detection members, and a cadmium shield member encompassing said indium shield member, said shield members serving as a means for absorbing thermal and low energy neutrons, whereby said indium detection member will detect fast neutron fluxes having an energy above about 1.5 mev., and said manganese member will detect fast neutron fluxes having an energy in the range of about 0.005 to 1.5 mev.

5. The badge set forth in claim 4, wherein said indium and manganese detection members are in the form of small rods, said indium shield member is tubular and encloses said rods, and said cadmium shield member is tubular and encloses said indium shield member.

6. The badge set forth in claim 4, wherein said indium and manganese detection members are in the form of foils, said foils being sandwiched between said indium and cadmium shield members.

7. The badge set forth in claim 6, and further including an unshielded indium foil member.

8. In a laminated identification badge which does not contain film-type personnel dosimetry components, the improvement comprising a neutron detector assembly mounted within said badge for identifying fast neutron fluxes, said neutron detector assembly including an indium neutron detection member, a manganese neutron detection member, an indium shield member encompassing said indium and manganese detection members, and a cadmium shield member encompassing said indium shield member, said shield members serving as a means for absorbing thermal and low energy neutrons, whereby said indium detection member will detect fast neutron fluxes having an energy above about 1.5 mev., and said manganese member will detect fast neutron fluxes having an energy in the range of about 0.005 to 1.5 mev.

9. The badge set forth in claim 8, wherein said indium and manganese detection members are in the form of foils, said foils being sandwiched between said indium and cadmium shield members.

10. The badge set forth in claim 9, and further including an unshielded indium foil member, said shielded indium foil and said unshielded indium foil member serving as means for identification of the thermal neutron flux.

11. In a personnel dosimeter badge which includes means for identifying thermal neutron fluxes and means for identifying other penetration radiations, the improvement comprising a neutron detector assembly mounted within said badge for identifying fast neutron fluxes having an energy above about 1.5 mev., said assembly comprising an indium neutron detection member, an inner indium shield encompassing said indium member, and an outer cadmium shield encompassing said indium shield, the thickness of said shields being selected to reduce by a factor of at least 8 to 1 the 54-minute half-life activation which would be characteristic of the indium member if exposed to the same flux in the unshielded condition, while at the same time effecting a comparatively minute reduction in the 4.5-hour half-life activation, whereby the activity of the 4.5-hour threshold reaction can be accurately measured in less than six hours after an exposure.

12. In a personnel dosimeter badge which includes means for identifying thermal neutron fluxes and means for identifying other penetration radiations, the improvement comprising a neutron detector assembly mounted within said badge for identifying fast neutron fluxes having an energy in the range of about 0.005 to 1.5 mev., comprising a manganese neutron detection member, an indium shield encompassing said manganese member, and a cadmium shield encompassing said indium shield, said shields serving as a means for absorbing thermal and low energy neutrons.

References Cited in the file of this patent
UNITED STATES PATENTS

| | | |
|---|---|---|
| 2,933,605 | Ross et al. | Apr. 19, 1960 |
| 2,938,121 | Fitzgerald et al. | May 24, 1960 |